United States Patent
Kim et al.

(10) Patent No.: US 11,392,719 B2
(45) Date of Patent: Jul. 19, 2022

(54) ELECTRONIC DEVICE AND METHOD FOR SECURING PERSONAL INFORMATION INCLUDED IN IMAGE

(71) Applicant: Samsung Electronics Co., Ltd., Gyeonggi-do (KR)

(72) Inventors: Sungoh Kim, Gyeonggi-do (KR); Prushinskiy Valeriy, Gyeonggi-do (KR); Hyungsok Yeo, Gyeonggi-do (KR); Dasom Lee, Gyeonggi-do (KR); Hyunhee Park, Gyeonggi-do (KR); Jonghoon Won, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 236 days.

(21) Appl. No.: 16/718,647

(22) Filed: Dec. 18, 2019

(65) Prior Publication Data
US 2020/0311305 A1    Oct. 1, 2020

(30) Foreign Application Priority Data
Mar. 28, 2019    (KR) .......................... 10-2019-0035716

(51) Int. Cl.
*G06F 21/62*    (2013.01)
*G06F 21/32*    (2013.01)
(Continued)

(52) U.S. Cl.
CPC .......... *G06F 21/6254* (2013.01); *G06F 21/32* (2013.01); *G06T 3/4015* (2013.01);
(Continued)

(58) Field of Classification Search
CPC . H04L 67/12; H04L 63/0421; G06F 21/6245; G06F 21/6254; G06K 9/00362
See application file for complete search history.

(56) References Cited

U.S. PATENT DOCUMENTS 9,785,796 B1    10/2017    Murphy et al.
9,911,002 B2 *   3/2018    Shim .................... H04N 1/4486
(Continued)

FOREIGN PATENT DOCUMENTS

KR    10-2015-0021280 A    3/2015
KR    10-1676000 B1       11/2016

OTHER PUBLICATIONS

International Search Report dated Mar. 25, 2020.

*Primary Examiner* — Tae K Kim
(74) *Attorney, Agent, or Firm* — Cha & Reiter, LLC

(57) ABSTRACT

An electronic device according to an embodiment includes: a camera including an image sensor; a communication module; a memory; and a processor operationally connected to the camera, the communication module, and the memory. The memory may store instructions that, when executed, instruct the processor to: acquire a first image including an external object by using the camera; acquire a second image including less information than the first image by using at least a part of the first image; transmit the second image to an external electronic device by using the communication module; receive security information corresponding to the second image from the external electronic device by using the communication module; and secure the first image, at least partially based on the security information. In addition, various other embodiments are possible.

17 Claims, 11 Drawing Sheets

(51) Int. Cl.
  *G06T 7/73*   (2017.01)
  *H04L 9/08*   (2006.01)
  *H04N 1/44*   (2006.01)
  *G06T 3/40*   (2006.01)
(52) U.S. Cl.
  CPC .............. *G06T 7/74* (2017.01); *H04L 9/0894* (2013.01); *H04N 1/4486* (2013.01); *G06F 2211/008* (2013.01)

(56) References Cited

U.S. PATENT DOCUMENTS

| | | | |
|---|---|---|---|
| 10,284,885 B1* | 5/2019 | Borras | H04L 63/0428 |
| 10,769,915 B2* | 9/2020 | Wang | G11B 27/036 |
| 10,841,642 B2* | 11/2020 | Altuev | G06T 3/4007 |
| 10,956,752 B2* | 3/2021 | Geiler | G06V 40/23 |
| 10,991,397 B2* | 4/2021 | Michaud | H04N 5/2628 |
| 2004/0202382 A1* | 10/2004 | Pilu | H04N 1/00342 |
| | | | 386/E5.072 |
| 2007/0002360 A1* | 1/2007 | Levien | G11B 27/34 |
| | | | 358/1.14 |
| 2012/0124389 A1* | 5/2012 | Villani | G06F 21/84 |
| | | | 713/189 |
| 2013/0108105 A1* | 5/2013 | Yoo | H04N 5/275 |
| | | | 382/103 |
| 2014/0023248 A1* | 1/2014 | Yoo | G08B 13/19686 |
| | | | 382/118 |
| 2015/0049912 A1* | 2/2015 | Migdal | G07F 19/207 |
| | | | 382/103 |
| 2015/0055775 A1 | 2/2015 | Choi et al. | |
| 2015/0205978 A1* | 7/2015 | Eisen | H04N 1/4486 |
| | | | 726/27 |
| 2015/0278535 A1* | 10/2015 | Holman | G06F 21/6209 |
| | | | 726/30 |
| 2016/0217300 A1* | 7/2016 | Kim | G06F 21/6245 |
| 2017/0039387 A1* | 2/2017 | Leonardi | H04L 63/0414 |
| 2017/0053128 A1* | 2/2017 | Lee | G06F 21/6245 |
| 2017/0061155 A1* | 3/2017 | Gordon | G06F 21/6254 |
| 2018/0151039 A1* | 5/2018 | Lemberger | H04L 12/4625 |
| 2018/0336666 A1 | 11/2018 | Kim et al. | |
| 2019/0138748 A1* | 5/2019 | Long | G06F 21/6254 |
| 2020/0098096 A1* | 3/2020 | Moloney | G06V 10/454 |
| 2020/0404122 A1* | 12/2020 | Kim | H04N 1/38 |

* cited by examiner

ELECTRONIC DEVICE AND METHOD FOR SECURING PERSONAL INFORMATION INCLUDED IN IMAGE

CROSS-REFERENCE TO RELATED APPLICATION(S)

This application is based on and claims priority under 35 U.S.C. 119 to Korean Patent Application No. 10-2019-0035716, filed on Mar. 28, 2019, in the Korean Intellectual Property Office, the disclosure of which is herein incorporated by reference in its entirety.

BACKGROUND

1) Field

One or more embodiments generally relate to an electronic device and a method for securing personal information included in an image.

2) Description of Related Art

Electronic devices, such as smart phones, tablet PCs, portable multimedia players (PMPs), personal digital assistants (PDAs), laptop personal computers (laptop PCs), wrist watches, or head-mounted displays, may include one or more cameras, and may capture images by using the cameras.

The user can upload images captured by the camera of an electronic device to an external electronic device, such as an electronic device or server of a social network service (SNS).

The above information is presented as background information only to assist with an understanding of the disclosure. No determination has been made, and no assertion is made, as to whether any of the above might be applicable as prior art with regard to the disclosure.

SUMMARY

With the increasing popularity of high-speed high-capacity wireless communication deployed on the above mentioned electronic devices, high quality original images (e.g. raw images) captured by the aforementioned cameras may be uploaded to an SNS server.

The server or the external electronic device may apply an image quality enhancement algorithm to the high quality original image received from the electronic device to enhance the quality of the image, and may provide the image having the enhanced quality back to the electronic device.

If the user of the electronic device uploads the image to the external electronic device or shares the image with another user through the social network service, personal information may be exposed or leaked to other people regardless of the user's intension. For example, one of the high-quality images may include the user's personal information (e.g. fingerprint information, iris information, or face information).

Recently, illegal hacking of servers has frequently occurred, and the information illegally obtained through hacking may cause great damage to the user.

According to an embodiment, an electronic device may include: a camera including an image sensor; a communication module; a memory; and a processor operationally connected to the camera, the communication module, and the memory. The memory may store instructions that, when executed, cause the processor to: acquire a first image including an external object by using the camera; acquire a second image including less information than the first image by using at least a part of the first image; transmit the second image to an external electronic device by using the communication module; receive security information corresponding to the second image from the external electronic device by using the communication module; and secure the first image at least partially based on the security information.

According to an embodiment, a method for securing personal information included in an image may include: acquiring a first image including an external object by using a camera that includes an image sensor; acquiring a second image including less information than the first image by using at least a part of the first image; transmitting the second image to an external electronic device by using a communication module; receiving security information corresponding to the second image from the external electronic device by using the communication module; and securing the first image, at least partially based on the security information.

According to an embodiment, an electronic device may include: a communication module; a memory; and a processor operationally connected to the communication module and the memory. The memory stores instructions that, when executed, cause the processor to: receive an image from an external electronic device by using the communication module; recognize at least one image segment in the image; determine security information included in the image and associated with the at least one image segment, at least partially based on a result of the recognition; and transmit the security information to the external electronic device by using the communication module.

Additional aspects will be set forth in part in the description which follows and, in part, will be apparent from the description, or may be learned by practice of the presented embodiments.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Hereinafter, embodiments of the disclosure will be described in detail with reference to accompanying drawings.

Figure 1:
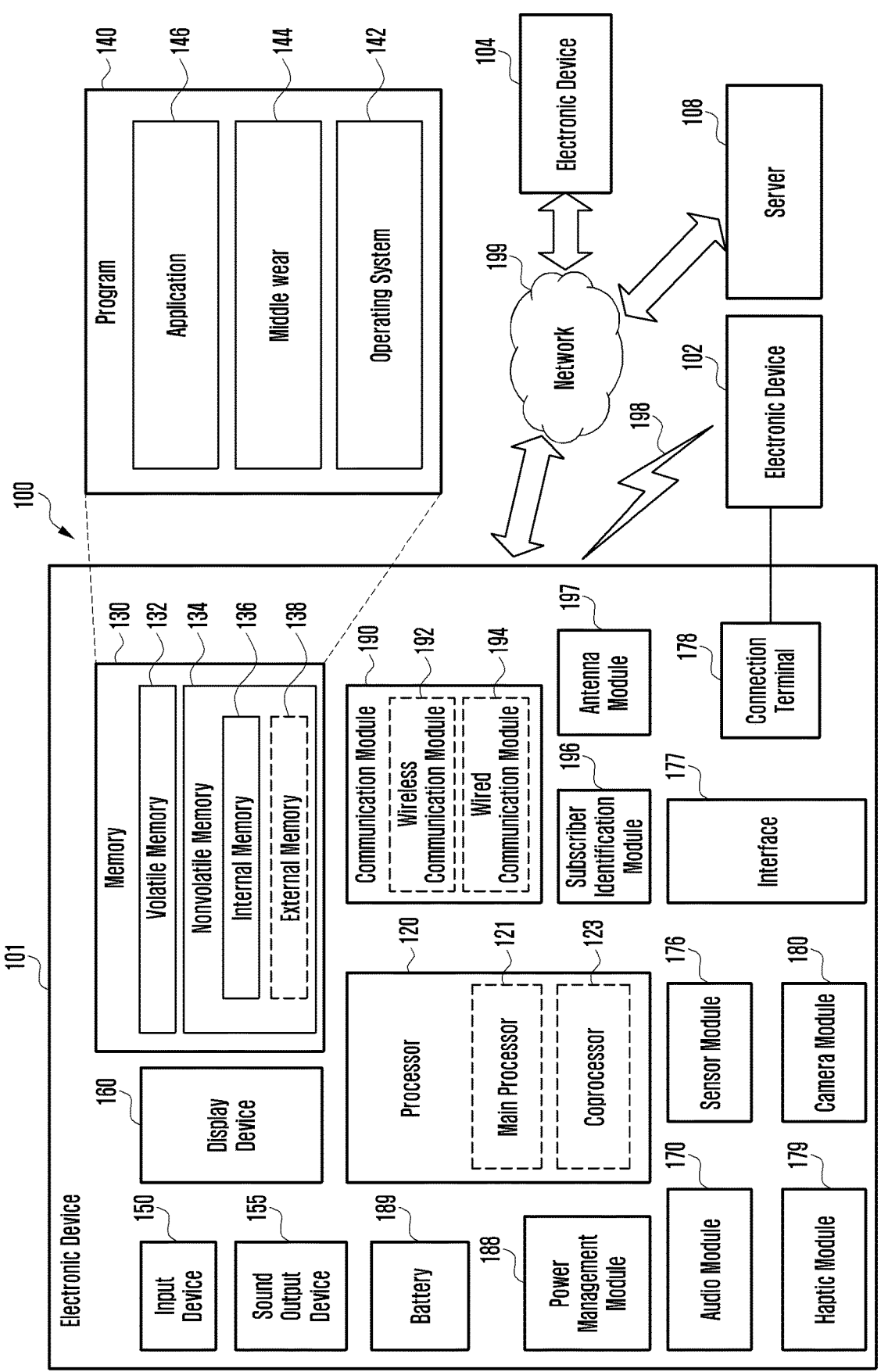
FIG. 1 is a block diagram of an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
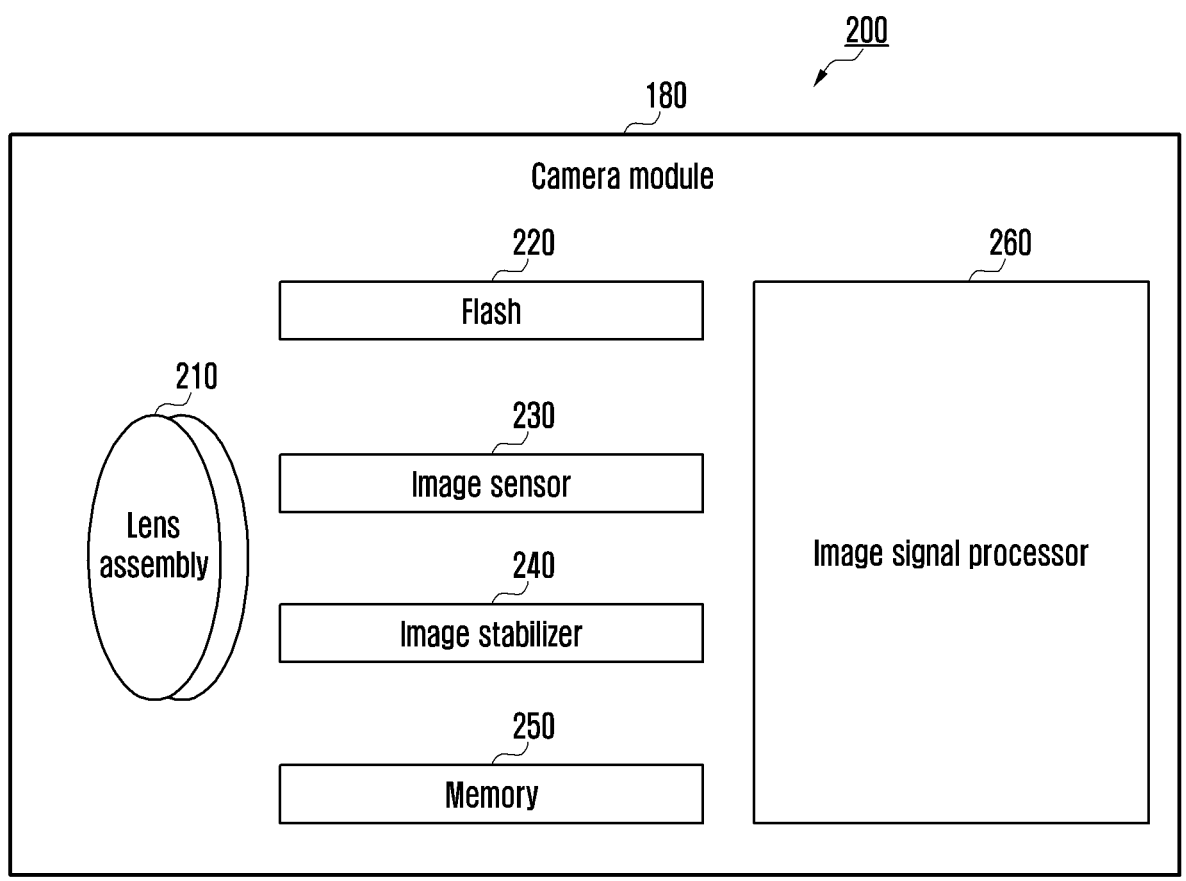
FIG. 2 is a block diagram illustrating a camera module according to an embodiment.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, autofocusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Herein is disclosed an electronic device and a method for securing personal information included in an image. An aspect of an embodiment disclosed herein is to prevent the unintended leakage of the user's personal information that may be included in the image.

According to certain embodiments, an electronic device and a method for securing personal information included in an image can prevent personal information included in the image from being leaked to the public.

According to certain embodiments, in an electronic device and a method for securing personal information included in an image, the user's personal information included in the image may be displayed only on the user's electronic device.

Figure 3:
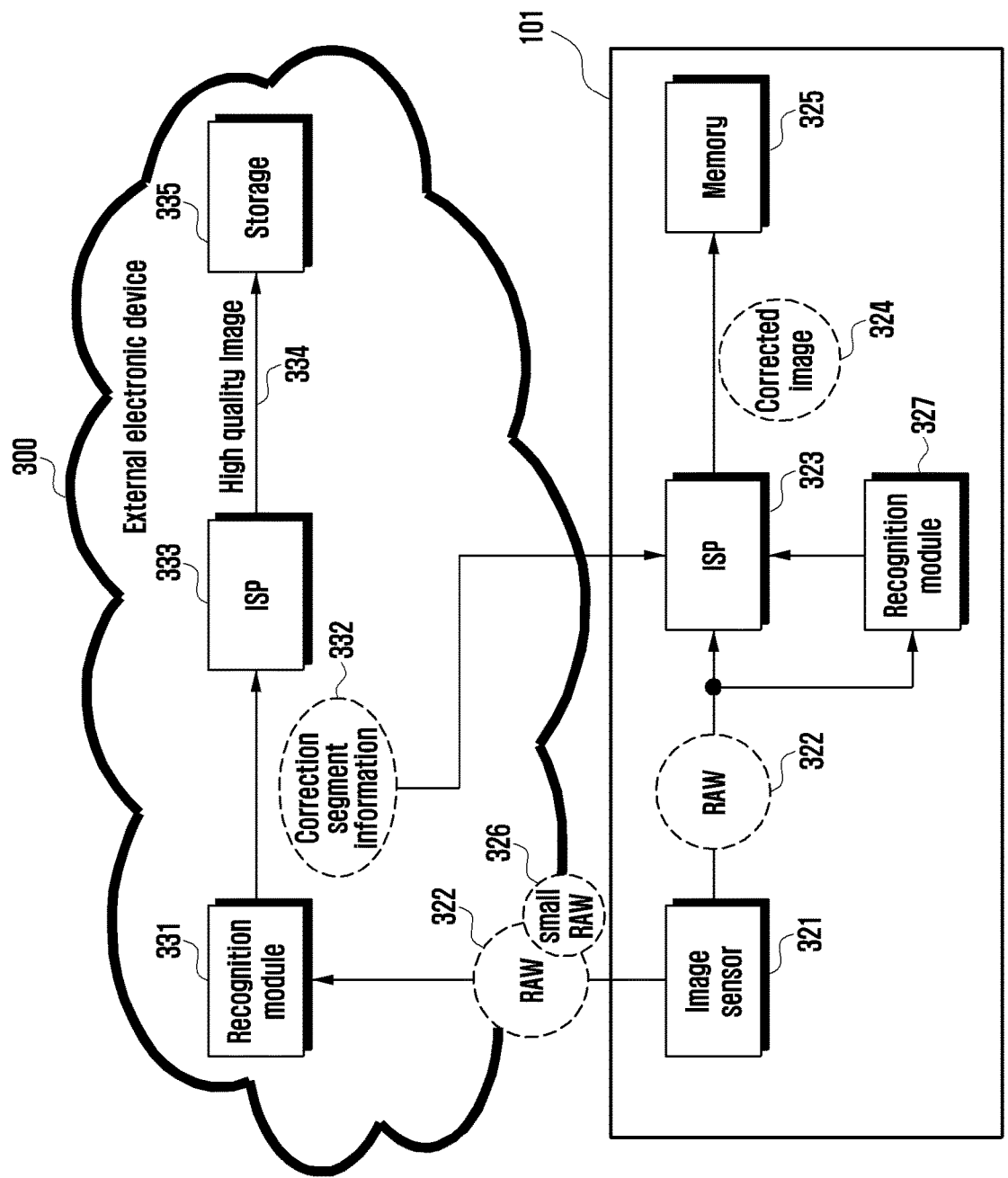
FIG. 3 is a block diagram illustrating operations of an electronic device and an external electronic device according to an embodiment.

FIG. 3 is a block diagram illustrating operations of an electronic device and an external electronic device according to an embodiment.

In an embodiment, the electronic device 101 may include an image sensor 321, an image signal processor (ISP) 323, and a memory 325. An external electronic device 300 (e.g. the electronic device 104 or the server 108) may include a recognition module 331, an ISP 333, and a storage 335. The recognition module 331 may be a logical module and may be implemented using a processor of the external electronic device 300 together with software. The ISP 333 may also be implemented using the processor of the external electronic device 300. In that example, the processor of the external electronic device 300 may perform both recognition and image processing. Although not illustrated, the electronic device 101 may include a communication module (e.g. the communication module 190 in FIG. 1) which can transmit or receive data to or from the external electronic device 300. The external electronic device 300 may include a communication module which can transmit or receive data to or from the electronic device 101. According to an embodiment, the electronic device 101 may include a recognition module 327. The recognition module 327 disposed in the electronic device 101 may be configured to perform functions identical to some of functions of the recognition module 331. For example, the recognition module 327 may be hardware or software configured to recognize a face in an image, and may be able to more simply and quickly recognize the face than the external electronic device 300 (e.g. the server) because the recognition is done locally rather than requiring the image to be transmitted over a network.

In an embodiment, the image sensor 321 (e.g. the image sensor 230 in FIG. 2) may acquire an image of an external object, and may generate a raw image 322 corresponding thereto. The raw image 322 may be implemented in various formats, such as Bayer format, color filter array (CFA) pattern, layer structure generated by sensing three colors for each pixel, format generated by different parallax acquired by each pixel, and the like. The image sensor 321 may transfer the raw image 322 to the ISP 323 (e.g. the image signal processor 260 in FIG. 2) and/or the recognition module 327.

In an embodiment, the image sensor 321 may generate a small raw image 326. The image sensor 321 may generate the small raw image 326 by reducing the raw image 322 by, for example, reducing its resolution. For example, the image sensor 321 may generate the small raw image 326 from the raw image 322 by using various down-scaling methods or down-sampling methods. The data volume of the small raw image 326 may be smaller than that of the raw image 322 due to the image sensor 321 adjusting the resolution of the raw image 322, filtering the raw image 322 through one or more frequency bands, and/or selecting one or more bit-plane levels of the raw image 322. For example, the image sensor 321 may generate the small raw image 326 by extracting a low-frequency band from the raw image 322. In another example, the image sensor 321 may generate the small raw image 326 by selecting some from among a multiple bit-plane levels of the raw image 322. The image sensor 321 may transmit the small raw image 326 to the external electronic device 300 through the communication module. The small raw image 326 may include at least a part of the raw image 322, and may be a smaller data file than the raw image 322. If the small raw image 326, instead of the raw image 322, is transmitted to the external electronic device, volume of data transmission is reduced, and thus the image can be more quickly transmitted to the external electronic device 300. In another embodiment, a processor (e.g. the processor 120) of the electronic device 101, instead of the image sensor 321, may generate the small raw image 326, and may transmit the generated small raw image 326 to the external electronic device 300 through the communication module. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

In an embodiment, the image sensor 321 may transmit a compressed raw image 322 to the ISP 323, the external electronic device 300, or the recognition module 327. The image sensor 321 may compress the raw image 322 and may store the compressed raw image 322 in an internal memory of the image sensor 321.

In an embodiment, the recognition module 331 of the external electronic device 300 may acquire the small raw image 326 through the communication module, and may segment the small raw image 326 into at least one image segment. The recognition module 331 may recognize the at least one image segment that resulted from the segmentation. For example, the recognition module 331 may segment the small raw image 326, and may identify at least one image segment from the small raw image 326 that resulted from the segmentation. The recognition module 331 may recognize the image segment by applying an object recognition algorithm or a text recognition algorithm to the image segment. Thus, the recognition module 331 of the external electronic device 300 may recognize at least one image segment by using various recognition algorithms, such as a machine learning or deep learning algorithm. For example, the recognition module 331 of the external electronic device 300 may acquire information associated with an image segment in which pixel coordinates (100, 101), (100, 102), (102, 102), and (102, 103) represent "person's teeth." The pixel coordinates may correspond to pixel coordinates of the raw image 322. The recognition module 331 may acquire, for example, classification information indicating that the small raw image 326 is classified as a category in which "a person is on a street." The recognition module 331 may acquire classification information by using the recognition result, or may acquire classification information by color distribution, etc. in the small raw image 326 without employing recognition. The recognition module 331 may generate correction segment information 332 including at least one of the classification information or the information associated with the at least one image segment acquired through the above-described process. The recognition module 331 may transmit the correction segment information 332 to the electronic device 101. The ISP 323 may correct the raw image 322 by using the correction segment information 332, and thus may generate a corrected image 324. The corrected image 324 may have, for example, a YUV format. The corrected image 324 may be stored in the memory 325. Alternatively, the corrected image 324 may be compressed by, for example, JPEG method, and the compressed image may be stored in the memory 325. According to an embodiment, the correction segment information may be generated by the recognition module 327 of the electronic device 101 and may then be transferred to the ISP 323.

In an embodiment, the raw image 322 provided from the image sensor 321 may be transmitted to the external electronic device 300, regardless of whether the small raw image 326 is transmitted. The external electronic device 300 may generate another correction segment information by using the raw image 322. By using the raw image 322, which is larger than the small raw image 326, the external electronic device 300 (e.g. the ISP 333 of the external electronic device 300) may generate correction segment information based on the raw image 322 in addition to the correction segment information generated from the small raw image 326, and may designate the same as extended correction segment information. Since the raw image 322 may include more information than the small raw image 326, the external electronic device 300 may generate more detailed correction segment information from the raw image 322. In one embodiment, the external electronic device 300 (the ISP 333 of the external electronic device 300) may only generate extended correction segment information from the raw image 322. Alternatively, the external electronic device 300 (e.g. the ISP 333 of the external electronic device 300) may generate extended correction segment information by using the raw image 322 as well as correction segment information generated from the small raw image 326.

In an embodiment, since the raw image 322 is larger than the small raw image 326, the small raw image 326 may be first transmitted to the external electronic device 300, followed by transmission of the raw image 322 to the external electronic device 300. For example, the raw image 322 may be transmitted to the external electronic device 300 while the ISP 323 corrects the raw image 322 using correction segment information generated from the small raw image 326. The raw image 322 may be uploaded to the external electronic device 300 as generated by the image sensor 321. Alternatively, a pre-processed version of the raw image 322, which has undergone lens distortion correction and noise removal, may be uploaded. The pre-processing may be performed by the external electronic device 300. The external electronic device 300 may perform demosaic processing or image format modification, or other pre-processing to improve the image recognition done by the recognition module 331. The ISP 333 of the external electronic device 300 may correct the received raw image 322. The external electronic device 300 may correct the raw image 322 by using the correction segment information 332 and/or the extended correction segment information. As the raw image 322 may be of higher quality than the small raw image 326, the ISP 333 of the external device 300 may acquire more detailed segment information from the higher quality image. The ISP 333 may generate the extended correction segment information by using the generated correction segment information and the raw image 322 together. The ISP 333 may generate a high quality image 334 by correcting the raw image 322 by using the extended correction segment information. The high quality image 334 may be stored in the storage 335 of the external electronic device 300 and may be downloaded to the electronic device 101.

Figure 4:
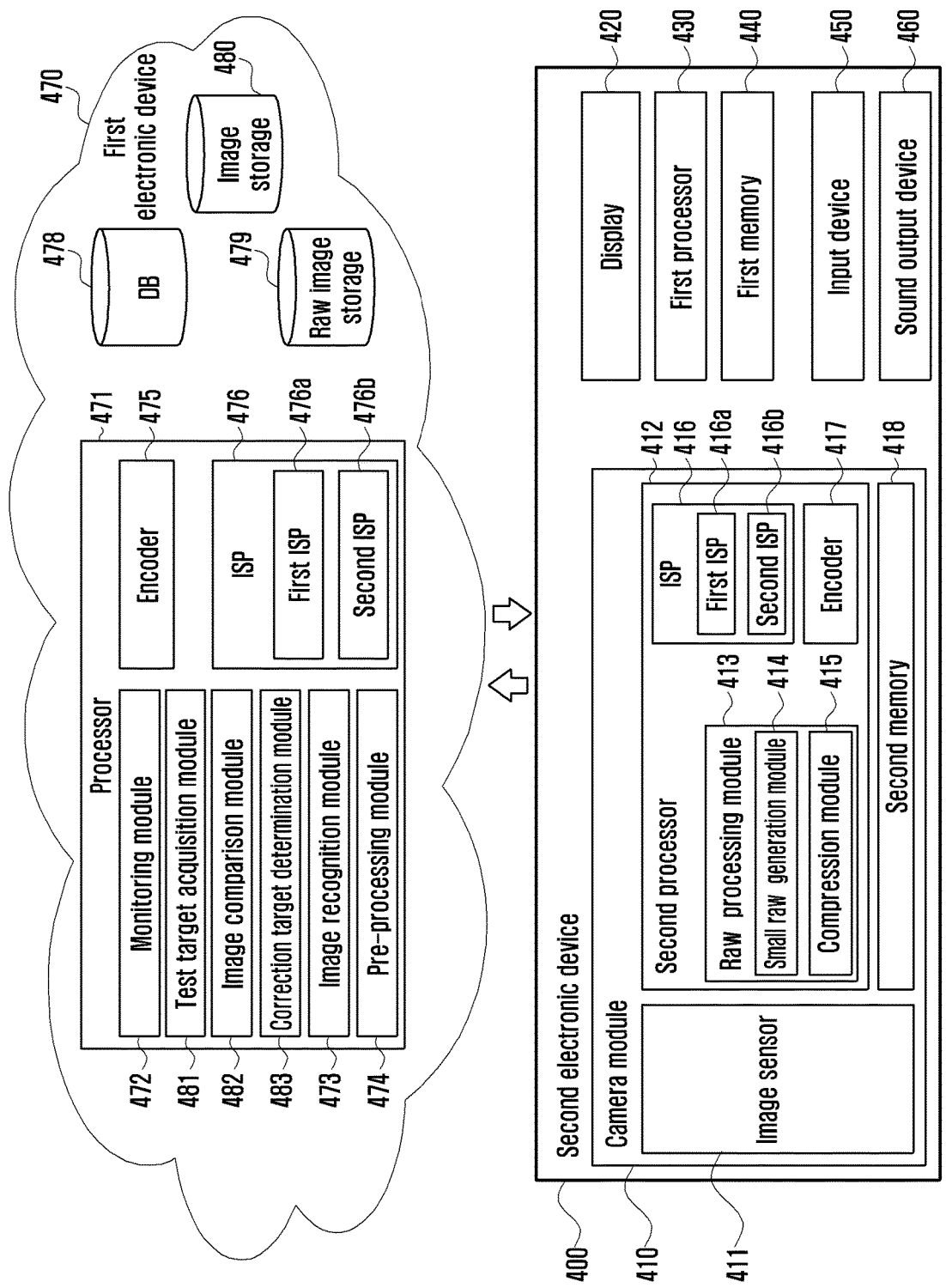
FIG. 4 is a block diagram of electronic devices according to an embodiment.

FIG. 4 is a block diagram of electronic devices according to an embodiment.

A first electronic device 470 (e.g. the electronic device 102 or the server 108) according to an embodiment may be implemented as a cloud server. The first electronic device 470 may perform network management, cloud service management relating to services and rights to be provided, and storage management, with respect to servers constituting a cloud system and with respect to electronic devices (e.g. a second electronic device 400) connectable to the cloud system.

The first electronic device 470 according to an embodiment may include a processor 471, a database 478, a raw image storage 479, and an image storage 480. The processor 471 according to an embodiment may include a pre-processing module 474, an image recognition module 473, an ISP 476, an encoder 475, a monitoring module 472, a test target acquisition module 481, an image comparison module 482, and a correction target determination module 483. According to an embodiment, the ISP 476 may be implemented as separate hardware.

According to an embodiment, the pre-processing module 474, the image recognition module 473, the encoder 475, the monitoring module 472, the test target acquisition module 481, the image comparison module 482, and the correction target determination module 483 may be logical modules. Thus, operations performed thereby may be performed by the processor 471 or a processor (e.g. a first processor 430 or a second processor 412) of the second electronic device 400.

According to an embodiment, at least one of the pre-processing module 474, the image recognition module 473, the ISP 476, the encoder 475, the monitoring module 472, the test target acquisition module 481, the image comparison module 482, or the correction target determination module 483 may be implemented as a separate hardware module in the processor 471 of the first electronic device 470 or a separate hardware module in the processor (e.g. the first processor 430 or the second processor 412) of the second electronic device 400.

The pre-processing module 474 according to an embodiment may pre-process an image (e.g. raw image or small raw image) received from the second electronic device 400 and may transmit the pre-processed image to the image recognition module 473, the raw image storage 479, or the ISP 476. According to an embodiment, the pre-processing may include decoding the image file received from the second electronic device 400 to generate a raw image.

The image recognition module 473 (e.g. the recognition module 331 in FIG. 3) according to an embodiment may receive an image (e.g. raw image or small raw image) from the second electronic device 400 through a communication module of the first electronic device 470 or via pre-processing module 474 thereof.

The image recognition module 473 according to an embodiment may recognize the received image by using various algorithms, such as (1) an object recognition algorithm, 2) a text recognition algorithm, or 3) a recognition algorithm acquired by applying machine learning or deep learning to an image storage (e.g. the raw image storage 479 and/or the image storage 480)). The image recognition module 473 may store the recognized result in a database (e.g. the raw image storage 479) in association with to the received image and/or may transmit the recognized result to the second electronic device 400. For example, the image recognition module 473 may recognize at least one object (e.g. a person, the sky, a cloud, a cat, a puppy, etc.) in the received image. The object may be recognized in an image segment within the image. According to an embodiment, the image recognition module 473 may recognize an object in an image corresponding to user information. For example, the user information may be acquired from an image (e.g. a picture of family or acquaintance, or a house picture) stored in the database 478. The recognized result may include position information (e.g. pixel coordinates) of an image segment and identification information of an object in the image segment. Further the recognized result may be used when the ISP 476 processes an image and when the test target acquisition module 481 selects a test target.

The image recognition module 473 according to an embodiment may store identification information of an object (or objects) recognized in the received image as category information of the received image, which may be stored in a database (e.g. the raw image storage 479) in associated with the category information. For example, the image recognition module 473 may store the identification information as tag information of a received image and store the same in a database. Alternatively, the image recognition module 473 may transmit the identification information to the second electronic device 400. The category information may include multiple categories which are hierarchically classified. For example, if a "cat" is recognized as an object in an image segment, the image recognition module 473 may configure identification information indicating an "animal"

as a superordinate category of the corresponding image and may configure identification information indicating the "cat" as a subordinate category of the corresponding image. According to an embodiment, the first electronic device 470 may receive category information corresponding to an image (e.g. raw image or small raw image) from the second electronic device 400, and may store the category information in the database in relation to the corresponding image.

The ISP 476 according to an embodiment may perform image processing (e.g. correction) on the received image by adjusting various values (e.g. brightness, shade, color, saturation, color temperature, sharpness, color harmony, vividness, contrast, or hue saturation value (HSV)) of the received image. The image processing may be performed based on recipe information (e.g. image segment, layer, vector, scene category, etc.) acquired through image recognition. For example, the ISP 476 may recognize an image segment, in which an object is positioned, of an image as a correction target, and may correct the image segment. The ISP 476 may receive additional information (e.g. feature vector indicating a feature of an object or a part thereof (e.g. a hair)) corresponding to the recipe information from the database 478, and may use the additional information for image processing. The processed image may be transmitted to the second electronic device 400 or the encoder 475, or may be stored in a database (e.g. the image storage 480). The image processing may include functions, such as white balance, color adjustment, noise reduction, sharpness effect, and detail enhancement. The functions may be performed for each image segment on the basis of the recipe information.

The encoder 475 according to an embodiment may generate an image file (e.g. JPEG, MPEG, 360-degree panorama, etc.) by encoding the corrected image processed by the ISP 476 or a raw image stored in the raw image storage 479. The image file generated by the encoder 475 may be transmitted to the second electronic device 400 through the communication module of the first electronic device 470, or may be stored in the database (e.g. the image storage 480).

The monitoring module 472 according to an embodiment may determine that the ISP 476, which is configured to process images in the first electronic device 470, has been changed from a first ISP 476a to a second ISP 476b. For example, the second ISP 476b may perform an upgraded correction method from that of the first ISP 476a.

In response to the determination made by the monitoring module 472, the test target acquisition module 481 according to an embodiment may acquire some of the images stored in the database (e.g. the raw image storage 479 or the image storage 480) as test targets for image processing. According to one embodiment, if the test targets are acquired from the raw image storage 479, image processing may be performed by the correction method of the first ISP 476a, to which a modification (e.g. replacement or upgrade) is not applied, and also the correction method of the second ISP 476b, to which modification has been applied. According to one embodiment, if the test targets are acquired from the image storage 480, image processing may be performed by on the second ISP 476b.

The test target acquisition module 481 according to an embodiment may acquire an equal number of test targets for one or more categories. For example, the test target acquisition module 481 may acquire the same number of images classified to the "puppy" category as the number of images classified as the "cat" category.

In an embodiment, each of the first ISP 476a and the second ISP 476b may correct the test targets acquired by the test target acquisition module 481, i.e. by adjusting various values (e.g. brightness, shade, color, saturation, color temperature, sharpness, color harmony, vividness, contrast, or HSV) of each the test targets. According to an embodiment, if a test target is a compressed image acquired from the image storage 480, the image may be decompressed first and then corrected.

The image comparison module 482 according to an embodiment may calculate, for each of the test targets acquired from the databases (e.g. the raw image storage 479), the difference between the values obtained through image correction by the first ISP 476a and obtained through image correction by the second ISP 476b. For example, the image comparison module 482 may select, as a comparison target, at least one from among brightness, shade, color, saturation, color temperature, sharpness, color harmony, vividness, contrast, or HSV on the basis of a tuning policy (e.g., effect) that is expected as the correction method is changed. For example, if the effect expected by the change of the correction method is an increase in contrast, the image comparison module 482 may calculate, for each of the test targets, the difference between the contrast values obtained by the image correction of the first ISP 476a and the image correction of the second ISP 476b. If the expected effect is an increase in the vividness of an image segment where the HSV has about 30 to 60 degrees, the image comparison module 482 may calculate, for each of the test targets, the difference between the color values obtained by image correction of the first ISP 476a and the image correction of the second ISP 476b.

The image comparison module 482 according to an embodiment may calculate, for each of the test targets acquired from the database (e.g. the image storage 480), the difference between a value of the images before and after the correction by the second ISP 476b.

The image comparison module 482 according to an embodiment may classify the test targets into two groups on the basis of the comparison result. For example, the image comparison module 482 may classify the test targets into a superordinate group having a difference in value exceeding a predetermined threshold and a subordinate group having a difference in value below the threshold. Here, the difference in value may refer to 1) the difference between values in images obtained by image correction of the first ISP 476a and image correction of the second ISP 476b, or 2) the difference between values in images before and after correction by the second ISP 476b.

The correction target determination module 483 according to an embodiment may determine a correction target on the basis of the comparison result acquired by the image comparison module 482. Here, the correction target may be selected from among images stored in the databases (e.g. the raw image storage 479 or the image storage 480). The correction target may undergo image processing by a correction method (e.g., the second ISP 476b) to which a modification (e.g. replacement or upgrade) has been applied, and then may be stored in the database (e.g. the image storage 480) and/or may be transmitted to the second electronic device 400. According to one embodiment, the correction target determination module 483 may recognize the subordinate group as a group having the correction effect which is not as expected, and accordingly, may identify a category of images belonging to the subordinate group, and may determine that images corresponding to the category of the subordinate group are not subject to be corrected. The correction target determination module 483 may select at least one test target from the superordinate group and may determine images corresponding to the category of the selected test target as correction targets among the images stored in the databases (e.g. the raw image storage 479 or the image storage 480).

According to an embodiment, category information used to determine the correction target may include information acquired by the image recognition module 473 and then stored in the database (e.g. the raw image storage 479 or the image storage 480) in association with the corresponding image. Further, the category information may include information which is received from an external device (e.g. the second electronic device 400) and stored in the database as metadata of the corresponding image together with the corresponding image.

In an embodiment, according to the comparison result acquired by the image comparison module 482, a category may be commonly associated with the test targets of the superordinate group or test targets of the subordinate group. For example, a first test target having a "cat" may belong to the superordinate group, while a second test target also having a "cat" may belong to the subordinate group. Thus, images that fall into both superordinate and subordinate groups may have less correction effects than expected. Therefore, the correction target determination module 483 may exclude images having a "cat" from correction targets.

As described above, according to one embodiment, the correction target determination module 483 may determine, as a correction target, a test target corresponding to category information which corresponds to a first level and does not correspond to a second level. The category corresponding to the first level may be a category of a test target belonging to a superordinate group according to the classification, and the category corresponding to the second level may be a category of a test target belonging to a subordinate group according to the classification.

In an embodiment, according to the comparison result acquired by the image comparison module 482, some metadata may be commonly associated with test targets belonging to the superordinate group and test targets belonging to the subordinate group. For example, although having the same ISO sensitivity, a first test target may belong to the superordinate group, while a second test target may belong to the subordinate group. In addition, specific recipe information (e.g. a scene category) may be commonly associated with a test target belonging to the superordinate group and a test target belonging to the subordinate group. As described above, images corresponding to the metadata or recipe information commonly associated with the superordinate group and the subordinate group may have less correction effect than expected. Accordingly, the correction target determination module 483 may exclude, from the correction targets, images having metadata or recipe information associated with the superordinate group and the subordinate group among the images stored in the databases (e.g. the raw image storage 479 or the image storage 480).

According to one embodiment, the correction target determination module 483 may determine a correction target on the basis of at least one of metadata or recipe information, as well as on the basis of the comparison result acquired by the operation of the image comparison module 482. For example, the correction target determination module 483 may identify metadata of test targets belonging to the superordinate group (hereinafter, referred to as an "upper metadata set"), and metadata of test targets belonging to the subordinate group (hereinafter referred to as a "lower metadata set"). The correction target determination module 483 may compare the upper metadata set and the lower metadata set to identify metadata (hereinafter, referred to as a "duplicate metadata set") included in both the upper metadata set and the lower metadata set. The correction target determination module 483 may determine, as the correction targets, images that corresponds to one or more metadata of the upper metadata set and does not correspond to two or more metadata of the duplicate metadata set. For example, if the upper metadata set includes a first ISO sensitivity value, a second ISO sensitivity value, a first brightness value, a second brightness value, a first sharpness value, and a second sharpness value, and the first ISO sensitivity value, the first brightness value, and the first sharpness value are determined as duplicate metadata, images having the first ISO sensitivity value, the second brightness value, and the second sharpness value may be determined as correction targets. Images having the first ISO sensitivity value, the first brightness value, and the second sharpness value may be excluded from the correction targets.

According to an embodiment, the metadata may be received from an external device (e.g. the electronic device 400) together with an image, and may be stored in the database (e.g. the raw image storage 479 or the image storage 480) in association with the image. For example, the metadata may be information acquired by an image sensor (e.g. an image sensor 411), and may include a focal length, an auto focus area, information (orientation) related to left and right rotation during photographing, auto white balance (AWB), color space, exposure time, aperture-related information (e.g. F-number, F-stop), exposure program (e.g. auto, aperture priority, shutter priority, manual, etc.), ISO speed ratings (ISO), date of image capturing (data time original), etc. The metadata may also include information, such as illuminance at an image-capturing place or time stamp, sensed by a sensor or clock other than the image sensor.

According to an embodiment, the recipe information may include information (e.g. image segment, layer, vector, scene category, etc.) acquired by the image recognition module 473 by recognizing an image (e.g. small raw image) received from an external device (e.g. the electronic device 400).

According to an embodiment, the correction target determination module 483 may determine correction targets on the basis of a tuning policy (e.g. an effect). For example, when images are corrected by a correction method (e.g., the second ISP 476b) to which modification (e.g. replacement or upgrade) has been applied, if the expected effect is an increase in brightness, the correction target determination module 483 may apply a weight to the difference value in brightness (e.g. may add a predetermined value to the difference value) so as to preferentially classify the test targets having brightness increased by the correction into the superordinate group.

The second electronic device 400 (e.g. the electronic device 101) according to an embodiment may include a camera module 410, a display 420, a first processor 430, a first memory 440, an input device 450, and a sound output device 460. The camera module 410 according to an embodiment may include an image sensor 411, a second processor 412, and a second memory 418. The second processor 412 according to an embodiment may include a raw image processing module 413, an ISP 416, and an encoder 417. At least some of operations performed by the second processor 412 may be performed by the first processor 430. The raw image processing module 413, the ISP 416, and the encoder 417 may be logical modules, and thus, operations performed thereby may be performed by the second processor 412 (e.g. the processor 120). In another embodiment, at least one of the raw image processing module 413, the ISP 416, and the encoder 417 may be implemented as separate hardware modules within the second processor 412.

Although not illustrated, the second electronic device 400 may include a communication module (e.g. the communication module 190 in FIG. 1) for data communication with the first electronic device 470, and the first electronic device 470 may also include a communication module for data communication with the second electronic device 400.

In an embodiment, the image sensor 411 (e.g. the image sensor 230 in FIG. 2 or the image sensor 321 in FIG. 3) may acquire various raw images of a subject. The image sensor 411 may acquire various types of raw images according to color filter array (CFA) pattern. The image sensor 411 may acquire a raw image having a dual pixel (DP) structure (or dual photodiode (2PD) structure) in which a pixel includes different parallax (or phase difference) information. The image sensor 411 may include multiple image sensors having identical or different characteristics (e.g. dual sensors (e.g. RGB+RGB, RGB+Mono, or Wide+Tele, etc.), or an array sensor (e.g. two or more sensors), etc.). The multiple image sensors may be used to acquire one or more raw images. The acquired raw images may be stored in the second memory 418 (e.g. DRAM) as is or after additional processing.

The raw image acquired according to an embodiment may be configured in various formats (e.g. Bayer format, etc.). The raw image may be represented by one of red (R), green (G), and blue (B) per pixel, and may be represented by a bit-depth of 8 to 16 bits. Various color filter array (CFA) patterns may be applied to the raw image. The raw image may have a layer structure including information on various colors (e.g. multiple colors of R, and B) for each pixel. According to various configurations of the image sensor, the raw image may include not only color information but also parallax (phase difference) information. Information (e.g. time, location, illuminance, etc.) related to capturing an image may be generated as metadata and stored in association with the raw image. For example, the second processor 412 may acquire metadata about the raw image using the image sensor 411. The metadata that can be acquired through the image sensor 411 includes, for example, focal length, auto focus area, information related to left and right rotation during image capturing (orientation), color space, and exposure time. In addition, the metadata may include location information of an image, which may be acquired through a sensor (e.g. a GPS sensor) different from the image sensor.

In an embodiment, the raw image processing module 413 may perform various processing on the raw image acquired from the image sensor 411. For example, the raw image processing module 413 may perform lens distortion correction or noise removal on the raw image.

The raw image processing module 413 according to an embodiment may include a small raw image generation module 414 and a compression module 415. The small raw image generation module 414 may generate a small raw image from a raw image by using various down-scaling methods (e.g. reducing the size or reducing the resolution) or down-sampling methods (e.g. taking only one or some of a series of sampled samples). The compression module 415 may compress the raw image or the small raw image by using various compression algorithms, and may store the compressed raw image or the compressed small raw image in the second memory 418. The small raw image may be temporarily or persistently stored in the second memory 418. The communication module (not shown) (e.g. the communication module 190) of the second electronic device 400 may transmit the small raw image stored in the second memory 418 to the first electronic device 470.

In an embodiment, the ISP 416 (e.g. the image signal processor 260 in FIG. 2 or the ISP 323 in FIG. 3) may perform image processing on a raw image stored in second memory 418. For example, the ISP 416 may process (e.g. correct) the raw image by using recipe information (e.g. image segment, layer, vector, scene category, etc.) acquired from the first electronic device 470 through the communication module in various ways. According to one embodiment, the ISP 416 may transmit the raw image or the small raw image to the first electronic device 470 through the communication module so that the first electronic device 470 generates recipe information for image processing. The ISP 416 may process the raw image by using the recipe information acquired from the first electronic device 470 through the communication module. The ISP 416 may compress the processed raw image into, for example, JPEG and may store the same in the first memory 440.

In an embodiment, the ISP 416 that performs image processing in the second electronic device 400 may be changed from a first ISP 416a to a second ISP 416b. For example, the second ISP 416b may have a correction method in which at least a part of the correction method of the first ISP 416a has been upgraded.

In an embodiment, the encoder 417 may encode the raw image processed by the ISP 416 to generate an image file (e.g. JPEG, MPEG, 360 degree panorama, etc.), and may store the image file in the first memory 440.

In an embodiment, the first processor 430 (e.g. the processor 120 in FIG. 1) may be electrically connected to the camera module 410, the display 420, the first memory 440, the input device 450, the sound output device 460, and the communication module (not shown) so as to control at least one thereof. Further, the first processor 430 may perform various data processing and operations.

According to an embodiment, the first processor 430 may update an image stored in the first memory 440 in response to the fact that the ISP 416 has changed from the first ISP 416a to the second ISP 416b. For example, the first processor 430 may perform functions identical to at least some functions of the processor 471 of the first electronic device 470 (e.g. at least one among the test target acquisition module 481, the image comparison module 482, and the correction target determination module 483).

According to an embodiment, an electronic device (e.g. the electronic device 101 in FIG. 1 or the second electronic device 400 in FIG. 4) may include: a camera (e.g. the camera module 180 in FIG. 1) including an image sensor (e.g. the camera module 180 in FIG. 1, the image sensor 230 in FIG. 2, the image sensor 321 in FIG. 3, or the image sensor 411 in FIG. 4); a communication module (e.g. the communication module 190 in FIG. 1); a memory (e.g. the memory 130 in FIG. 1, the memory 250 in FIG. 2, or the memory 325 in FIG. 3); and a processor (e.g. the processor 120 in FIG. 1, the image signal processor 260 in FIG. 2, the ISP 323 in FIG. 3, or the first processor 430 or the second processor 412 in FIG. 4) operationally connected to the camera, the communication module, and the memory. The memory may store instructions that, when executed, cause the processor to: acquire a first image including an external object by using the camera; acquire a second image including less information than the first image by using at least a part of the first image; transmit the second image to an external electronic device (e.g. the electronic device 104 or the server 108 in FIG. 1, the external electronic device 300 in FIG. 3, or the first electronic device 470 in FIG. 4) by using the communication module; receive security information corresponding to the second image from the external electronic device by using the communication module; and secure the first image, at least partially based on the security information.

According to an embodiment, the security information corresponding to the second image may relate to at least one biometric information segment of the external object.

According to an embodiment, the instructions may further cause the processor (e.g. the processor 120 in FIG. 1, the image signal processor 260 in FIG. 2, the ISP 323 in FIG. 3, or the first processor 430 or the second processor 412 in FIG. 4) to divide, at least partially based on the security information, the first image into a first security level segment and a second security level segment.

According to an embodiment, the instructions may further cause the processor (e.g. the processor 120 in FIG. 1, the image signal processor 260 in FIG. 2, the ISP 323 in FIG. 3, or the first processor 430 or the second processor 412 in FIG. 4) to: generate a security key and store the security key in the memory (e.g. the memory 130 in FIG. 1, the memory 250 in FIG. 2, or the memory 325 in FIG. 3); acquire a third image in which the second security level segment of the first image has been encoded based on the security key; and transmit the third image to the external electronic device (e.g. the electronic device 104 or the server 108 in FIG. 1, the external electronic device 300 in FIG. 3, or the first electronic device 470 in FIG. 4).

According to an embodiment, the instructions may further cause the processor (e.g. the processor 120 in FIG. 1, the image signal processor 260 in FIG. 2, the ISP 323 in FIG. 3, or the first processor 430 or the second processor 412 in FIG. 4) to: receive a fourth image, in which the first security level segment of the third image has been at least partially corrected, from the external electronic device (e.g. the electronic device 104 or the server 108 in FIG. 1, the external electronic device 300 in FIG. 3, or the first electronic device 470 in FIG. 4); and acquire a fifth image in which the fourth image has been decoded using the security key stored in the memory (e.g. the memory 130 in FIG. 1, the memory 250 in FIG. 2, or the memory 325 in FIG. 3).

According to an embodiment, the instructions may further cause the processor (e.g. the processor 120 in FIG. 1, the image signal processor 260 in FIG. 2, the ISP 323 in FIG. 3, or the first processor 430 or the second processor 412 in FIG. 4) to acquire the third image by mosaicking, masking, or scrambling the second security level segment of the first image.

According to an embodiment, the instructions may further cause the processor (e.g. the processor 120 in FIG. 1, the image signal processor 260 in FIG. 2, the ISP 323 in FIG. 3, or the first processor 430 or the second processor 412 in FIG. 4) to: extract the first security level segment from the first image and generate the third image including the first security level segment; and extract the second security level segment from the first image and generate a security segment image based on the second security level segment.

According to an embodiment, the instructions may further cause the processor (e.g. the processor 120 in FIG. 1, the image signal processor 260 in FIG. 2, the ISP 323 in FIG. 3, or the first processor 430 or the second processor 412 in FIG. 4) to: transmit the third image to the external electronic device; and store the security segment image in the memory (e.g. the memory 130 in FIG. 1, the memory 250 in FIG. 2, or the memory 325 in FIG. 3).

According to an embodiment, the instructions may further cause the processor (e.g. the processor 120 in FIG. 1, the image signal processor 260 in FIG. 2, the ISP 323 in FIG. 3, or the first processor 430 or the second processor 412 in FIG. 4) to: receive the fourth image, in which the third image has been at least partially corrected, from the external electronic device (e.g. the electronic device 104 or the server 108 in FIG. 1, the external electronic device 300 in FIG. 3, or the first electronic device 470 in FIG. 4); and acquire the fifth image by synthesizing the fourth image and the security segment image.

According to an embodiment, the instructions may further cause the processor (e.g. the processor 120 in FIG. 1, the image signal processor 260 in FIG. 2, the ISP 323 in FIG. 3, or the first processor 430 or the second processor 412 in FIG. 4) to: provide, based on the received security information, a user with an image indicating the first security level segment and the second security level segment; and separate the first security level segment and the second security level segment from each other on the basis of a user input selecting a part or an entirety of the first security level segment or the second security level segment.

According to an embodiment, the instructions may further cause the processor (e.g. the processor 120 in FIG. 1, the image signal processor 260 in FIG. 2, the ISP 323 in FIG. 3, or the first processor 430 or the second processor 412 in FIG. 4) to: receive another user input designating another segment other than the first security level segment and the second security level segment in the provided image; and determine the designated another segment as the second security level segment.

Figure 5:
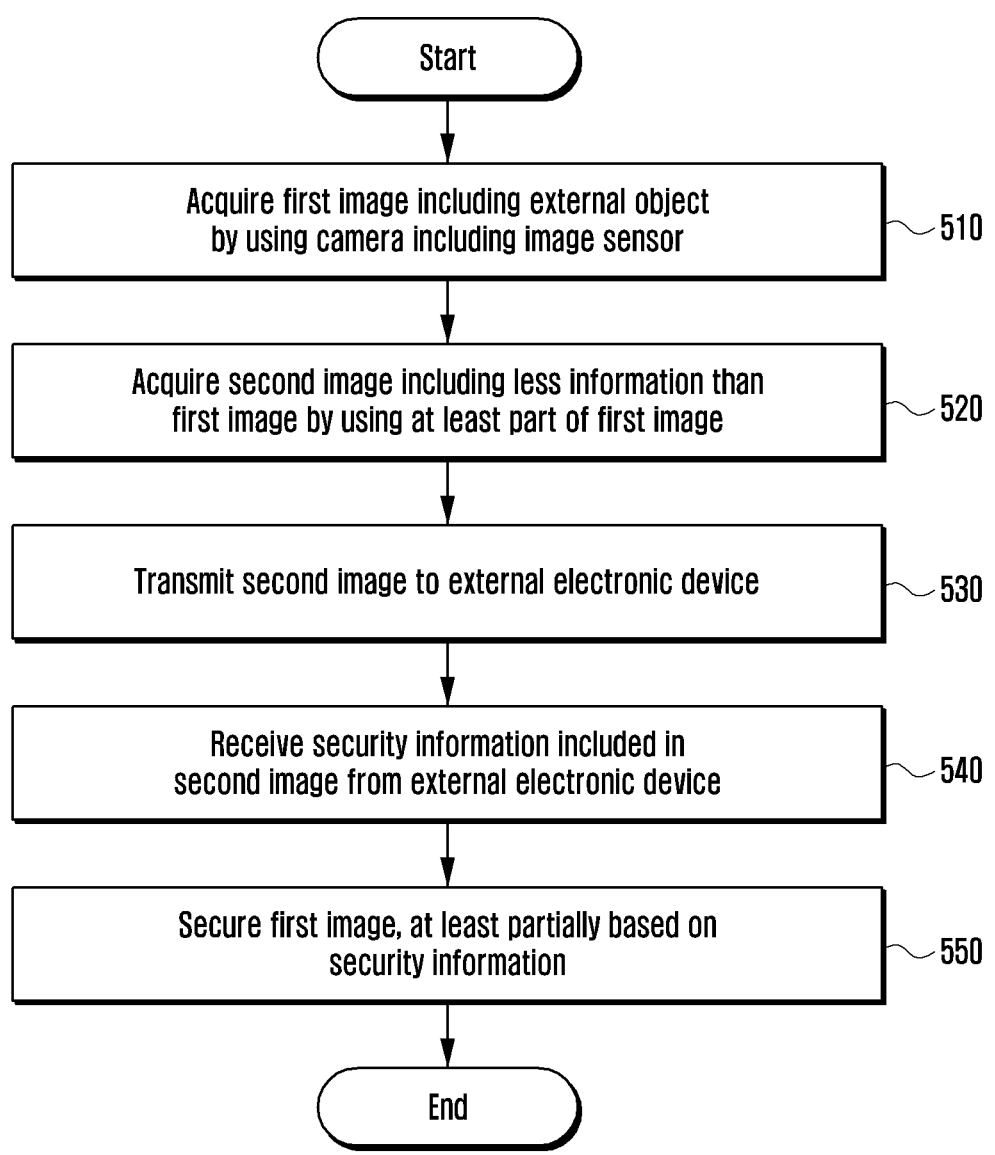
FIG. 5 is a flowchart illustrating a method for securing personal information included in an image in an electronic device according to an embodiment.

FIG. 5 is a flowchart illustrating a method for securing personal information included in an image in an electronic device according to an embodiment.

Referring to FIG. 5, in operation 510, according to an embodiment, the processor 120 of the electronic device 101 (e.g. the second electronic device 400 in FIG. 4) may acquire a first image including an external object by using a camera including an image sensor (e.g. the camera module 180 in FIG. 1, the image sensor 230 in FIG. 2, the image sensor 321 in FIG. 3, or the image sensor 411 in FIG. 4). The first image may be a raw image (e.g. the raw image 322 in FIG. 3) and/or an image (e.g. a JPEG image) obtained by processing or correcting the raw image.

According to an embodiment, the first image may be in various formats (e.g. Bayer format, etc.). The first image may be represented by one of red (R), green (G), and blue (B) per pixel, and may be represented by a bit-depth of 8 to 16 bits. Various color filter array (CFA) patterns may be applied to the first image. The first image may have a layer structure including information on various colors (e.g. multiple colors of R, G, and B) for each pixel. According to various configurations of the image sensor, the first image may include not only color information (e.g. RGB) but also phase difference information. Information (e.g. time, location, illuminance, etc.) related to capturing of the image may be generated as metadata and stored in association with the first image.

In operation 520, according to an embodiment, the processor 120 of the electronic device 101 may acquire a second image including less information than the first image by using at least a part of the first image. The second image may be a small image (the small raw image 326 in FIG. 3) related to the raw image and/or a small image of a processed image (e.g. a JPEG image).

According to an embodiment, the processor 120 may generate the second image by reducing the data in the first image. For example, the processor 120 may generate the second image from the first image by using various downscaling methods or down-sampling methods. The data volume of the second image may be smaller than that of the first image due to the processor 120 adjusting the resolution of the first image, filtering the first image through one or more frequency bands, and/or selecting one or more bit-plane levels of the fir image. The processor 120 may generate the second image by extracting a low-frequency band from the first image. The processor 120 may generate the second image by selecting some from among the multiple bit-plane levels of the first image.

In operation 530, according to an embodiment, the processor 120 of the electronic device 101 may transmit the second image to the external electronic device 300 (e.g. the electronic device 104 or the server 108 in FIG. 1 or the first electronic device 470 in FIG. 4) through the communication module (e.g. the communication module 190 in FIG. 1).

According to an embodiment, the processor 120 may transmit the second image having a smaller capacity than the first image to the external electronic device 300 such that the external electronic device 300 generates security recipe information for securing the first or second image. According to one embodiment, the processor 120 may request security recipe information from the external electronic device 300 so as to divide the second image into a first security level segment and a second security level segment requiring higher security than the first security level segment.

According to an embodiment, the security recipe information may be used to divide the second image into multiple security level segments (e.g. three security level segments). In this instance, multiple servers may process the second image for multiple security levels. For example, a first server may be configured to process a first security level segment included in the second image, and a second server may be configured to process a second security level segment. In another example, a third security level segment may be processed by the electronic device 101.

In operation 540, according to an embodiment, the processor 120 of the electronic device 101 may receive security information included in the second image from the external electronic device 300 by using the communication module (e.g. the communication module 190 in FIG. 1).

According to an embodiment, the external electronic device 300 may use the second image to recognize at least one image segment. For example, the external electronic device 300 may determine at least one image segment (e.g. a security segment) that includes personal information.

According to an embodiment, instead or in addition to determining personal information (e.g. fingerprint information, iris information, or face information), the external electronic device 300 may apply an object recognition algorithm or a text recognition algorithm to the second image so as to identify an object (e.g. a person) or recognize a specific segment of the object (e.g. "the person's face," "the person's eye," or "the person's hand"). For example, the external electronic device 300 may identify an object (e.g. a driver's license) in the second image, but may not determine personal information (e.g. license number) included in the object.

According to an embodiment, the external electronic device 300 may include at least one image segment (e.g. "the person's face," "the person's eye," or "the person's hand") of the second image, which is considered to include personal information, in security information, and may transmit the same to the electronic device 101. According to one embodiment, the security information may include location information (e.g. pixel coordinates) of at least one image segment considered to include personal information and/or identification information (e.g. "the person's face," "the person's eye," or "the person's hand") of each of image segments.

According to an embodiment, the external electronic device 300 may transmit correction segment information (e.g. the correction segment information 332) to the electronic device 101 together with the security information of the second image.

In operation 550, according to an embodiment, the processor 120 of the electronic device 101 may secure the first image, at least partially based on the security information.

According to an embodiment, the processor 120 may divide, at least partially based on the security information, the first image into a first security level segment and a second security level segment.

According to an embodiment, the processor 120 may generate a security key as a part of the method for securing the first image and store the security key in the memory, may acquire a third image in which the second security level segment of the first image has been encoded based on the security key, and may transmit the third image to the external electronic device 300. For example, the processor 120 may acquire the third image by mosaicking, masking, or scrambling the second security level segment of the first image. According to an embodiment, the processor 120 may receive, from the external electronic device 300, a fourth image in which the first security level segment of the third image has been at least partially corrected, and may acquire a fifth image in which the fourth image has been decoded using the security key stored in the memory 130.

According to an embodiment, as a part of the method for securing the first image, the processor 120 may extract the first security level segment from the first image and generate the third image including the first security level segment, and may extract the second security level segment from the first image and generate a security segment image including the second security level segment. According to an embodiment, the processor 120 may transmit the third image to the external electronic device 300 and may store the security segment image in the memory 130.

According to an embodiment, the processor 120 may receive, from the external electronic device 300, the fourth image in which the third image has been at least partially corrected, and acquire the fifth image by using the fourth image and the security segment image.

Figure 6:
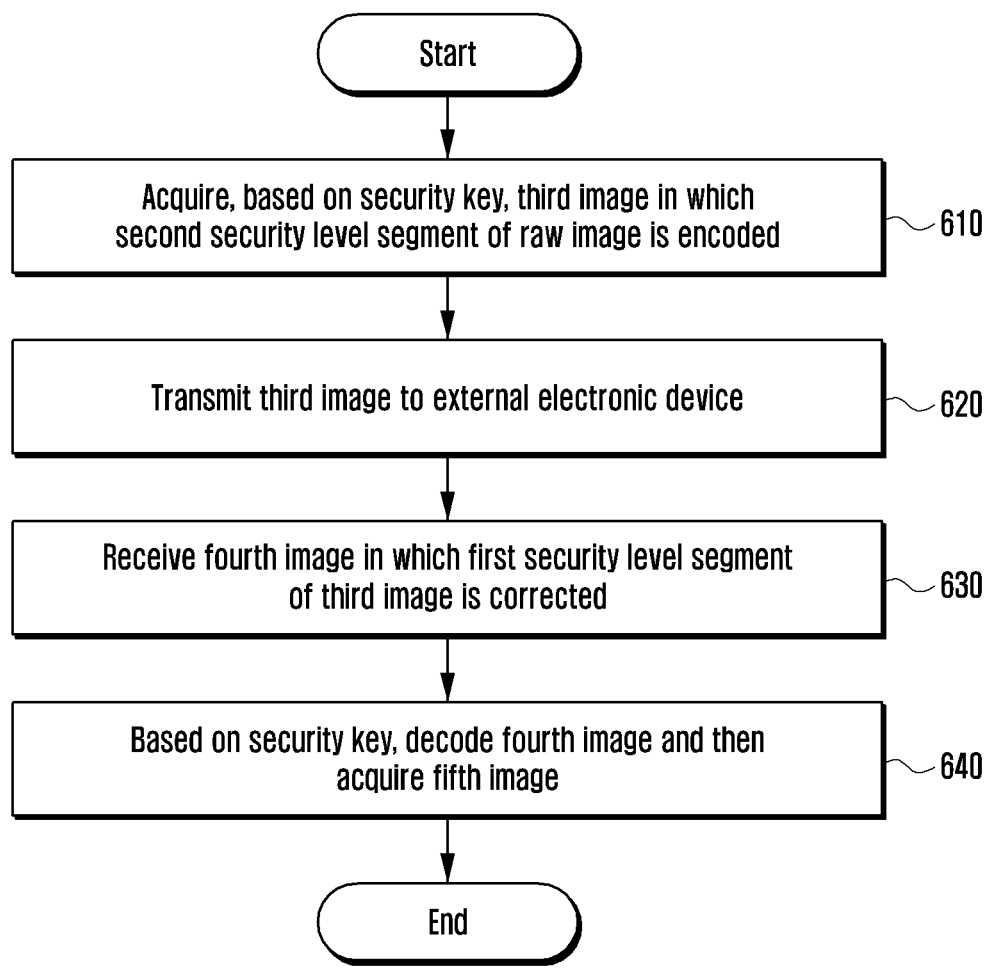
FIG. 6 is a flowchart illustrating a method for securing a first image in an electronic device according to an embodiment.

FIG. 6 is a flowchart illustrating a method for securing a first image in an electronic device according to an embodiment. The operations in FIG. 6 may be included as a part of operation 550 or the entirety thereof in FIG. 5.

Referring to FIG. 6, in operation 610, according to an embodiment, the processor 120 of the electronic device 101 may acquire a third image in which a second security level segment of the first image has been encoded based on the security key.

According to an embodiment, security information included in a second image received from the external electronic device 300 (e.g. the electronic device 104 or the server 108 in FIG. 1 or the first electronic device 470 in FIG. 4) may include security recipe information used to divide the second image into a first security level segment and/or a second security level segment requiring higher security than the first security level segment. The processor 120 may divide, at least partially based on the security information or the security recipe information, the first image into a first security level segment and a second security level segment.

According to an embodiment, the first image may be divided into multiple security segments (e.g. three security level segments) according to the security information or the security recipe information.

According to an embodiment, the processor 120 may provide, based on the security information received from the external electronic device 300, a user with an image indicating at least one security segment, and may determine the first security level segment and the second security level segment on the basis of a user input selecting a part of the at least one security segment or the entirety thereof. For example, the processor may display at least one security segment (e.g. "a person's face," "a person's eye," or "a person's hand) in the provided image, and, if the user selects a specific segment (e.g. "the person's eye"), may designate the selected specific segment (e.g. "the person's eye") as the second security level segment.

According to an embodiment, the processor 120 may receive a user input designating another segment (e.g. a segment of the image showing a document) other than the at least one security segment within the provided image, and may determine the designated another segment as the second security level segment.

According to an embodiment, the processor 120 may generate a security key and then may store the security key in the memory. The processor 120 may generate the encoded third image from the first image by using the security key and a hash function.

In operation 620, according to an embodiment, the processor 120 of the electronic device 101 may transmit the third image to the external electronic device 300 (e.g. the electronic device 104 or the server 108 in FIG. 1, or the first electronic device 470 in FIG. 4) through the communication module (e.g. the communication module 190 in FIG. 1). For example, the third image may have the second security level segment which has been mosaicked, masked, and scrambled.

In operation 630, according to an embodiment, the processor 120 of the electronic device 101 may receive a fourth image, in which the first security level segment of the third image is corrected, from the external electronic device 300 through the communication module (e.g. the communication module 190 in FIG. 1).

According to an embodiment, the external electronic device 300 may correct at least a part of the first security level segment. For example, the external electronic device 300 may correct the first security level segment by using the existing generated correction segment information (e.g. the correction segment information 332), or may correct the first security level segment by using extended correction segment information. The external electronic device 300 has no security key used for the third image, and thus may not determine the second security level segment. For example, the external electronic device 300 may not correct the second security level segment.

In operation 640, according to an embodiment, the processor 120 of the electronic device 101 may decode the fourth image on the basis of the security key stored in the memory 130 and then acquire the fifth image.

According to an embodiment, the processor 120 may acquire the fifth image only by decoding the fourth image. For example, the processor 120 may demosaic, unmask, or unscramble the second security level segment in the fourth image. According to an embodiment, the processor 120 may decode the fourth image and then correct the second security level segment using the correction segment information (e.g. the correction segment information 332), thereby acquiring the fifth image. The fifth image may be stored in the memory 130.

Figure 7:
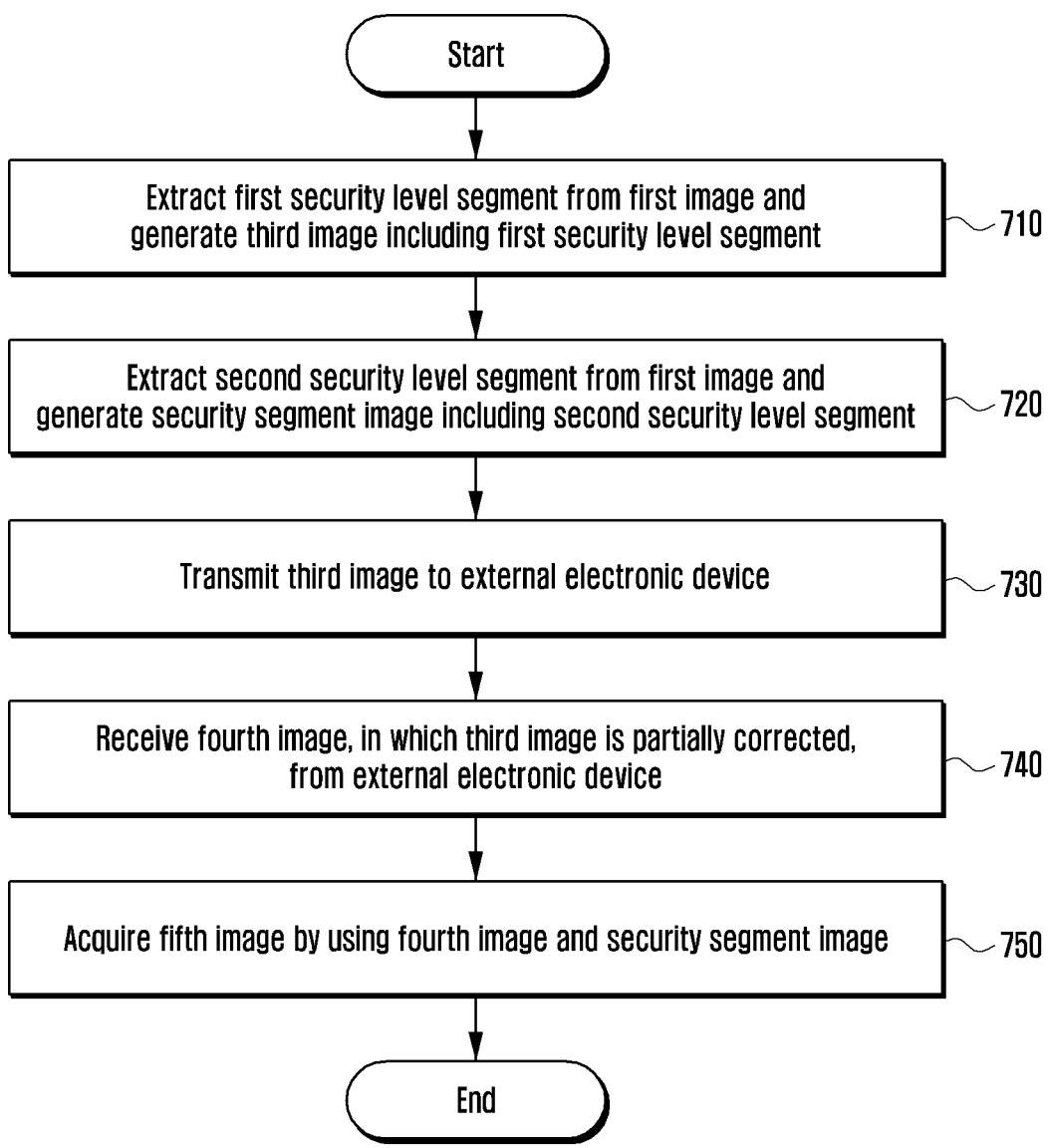
FIG. 7 is a flowchart illustrating a method for securing a first image in an electronic device according to an embodiment.

FIG. 7 is a flowchart illustrating a method for securing a first image in an electronic device according to an embodiment. The operations in FIG. 7 may be included as a part of operation 550 or the entirety thereof in FIG. 5.

Referring to FIG. 7, in operation 710, according to an embodiment, the processor 120 of the electronic device 101 may extract a first security level segment from a first image and generate a third including the first security level segment.

According to an embodiment, security information included in a second image received from the external electronic device 300 (e.g. the electronic device 104 or the server 108 in FIG. 1 or the first electronic device 470 in FIG. 4) may include security recipe information used to divide the second image into a first security level segment and/or a second security level segment requiring higher security than the first security level segment. The processor 120 may divide, at least partially based on the security information or the security recipe information, the first image into the first security level segment and the second security level segment. According to an embodiment, the security information may be used to divide the first image into multiple security segments (e.g. three security level segments)

According to an embodiment, the processor 120 may provide, based on the security information received from the external electronic device 300, a user with an image indicating at least one security segment, and may separate the first security level segment and the second security level segment from each other on the basis of a user input selecting a part of the at least one security segment or the entirety thereof. For example, the processor may display at least one security segment (e.g. "a person's face," "a person's eye," or "a person's hand) in the provided image, and, if the user selects a specific segment (e.g. "the person's eye"), may designate the selected specific segment (e.g. "the person's eye") as the second security level segment.

According to an embodiment, the processor 120 may receive a user input designating another segment (e.g. a portion of the image showing a document) other than the at least one security segment within the provided image, and may determine the designated another segment as the second security level segment.

According to an embodiment, the processor 120 may extract the first security segment, at least partially based on the security information. For example, the third image may include only the first security segment within the first image.

In operation 720, according to an embodiment, the processor 120 of the electronic device 101 may extract the second security level segment from the first image and generate a security segment image including the second security level segment.

According to an embodiment, the processor 120 may extract the second security level segment, at least partially based on the security information. For example, the security segment image may include only the second security level segment within the first image. In this example, the security segment image may be removed from the third image.

In operation 730, according to an embodiment, the processor 120 of the electronic device 101 may transmit the third image to the external electronic device 300 through the communication module (e.g. the communication module 190 in FIG. 1).

In operation 740, according to an embodiment, the processor 120 of the electronic device 101 may receive a fourth image, in which at least a part of the third image is corrected, from the external electronic device 300 through the communication module (e.g. the communication module 190 in FIG. 1).

According to an embodiment, the external electronic device 300 may correct at least a part of the third image including the first security segment. For example, the external electronic device 300 may correct the third image by using the existing generated correction segment information (e.g. the correction segment information 332), or may correct the third image by using extended correction segment information.

In operation 750, according to an embodiment, the processor 120 of the electronic device 101 may acquire a fifth image by using the fourth image and the security segment image.

According to an embodiment, the processor 120 may acquire the fifth image by synthesizing the fourth image and the security segment image. According to one embodiment, the processor 120 may correct the security segment image including the second security level segment by using the correction segment information (e.g. the correction segment information 332), and may acquire the fifth image by synthesizing the fourth image and the corrected security segment image. The fifth image may be stored in the memory 130.

According to an embodiment, a method for securing personal information included in an image may include: acquiring a first image including an external object by using a camera that includes an image sensor (operation 510); acquiring a second image including less information than the first image by using at least a part of the first image (operation 520); transmitting the second image to an external electronic device by using a communication module (operation 530); receiving security information corresponding to the second image from the external electronic device by using the communication module (operation 540); and securing the first image, at least partially based on the security information (operation 550).

According to an embodiment, the security information corresponding to the second image may relate to at least one biometric information segment of the external object.

According to an embodiment, the securing (operation 550) may include dividing, at least partially based on the security information, the first image into a first security level segment and a second level security segment.

According to an embodiment, the method for securing personal information included in an image may include: generating a security key and storing the security key in a memory; acquiring a third image in which the second security level segment of the first image has been encoded based on the security key (operation 610); and transmitting the third image to the external electronic device (operation 620).

According to an embodiment, the method for securing personal information included in an image may include: receiving, from the external electronic device, a fourth image in which the first security level segment of the third image has been at least partially corrected (operation 630); and acquiring a fifth image in which the fourth image has been decoded using the security key stored in the memory (operation 640).

According to an embodiment, the method for securing personal information included in an image may include: extracting the first security level segment from the first image and generating the third image including the first security level segment (operation 710); and extracting the second security level segment from the first image and generating a security segment image based on the second security level segment (operation 720).

According to an embodiment, the method for securing personal information included in an image may include: transmitting the third image to the external electronic device; and storing the security segment image in the memory.

According to an embodiment, the method for securing personal information included in an image may include: receiving, from the external electronic device, the fourth image in which the third image has been at least partially corrected (operation 740); and acquiring the fifth image by synthesizing the fourth image and the security segment image (operation 750).

Figure 8:
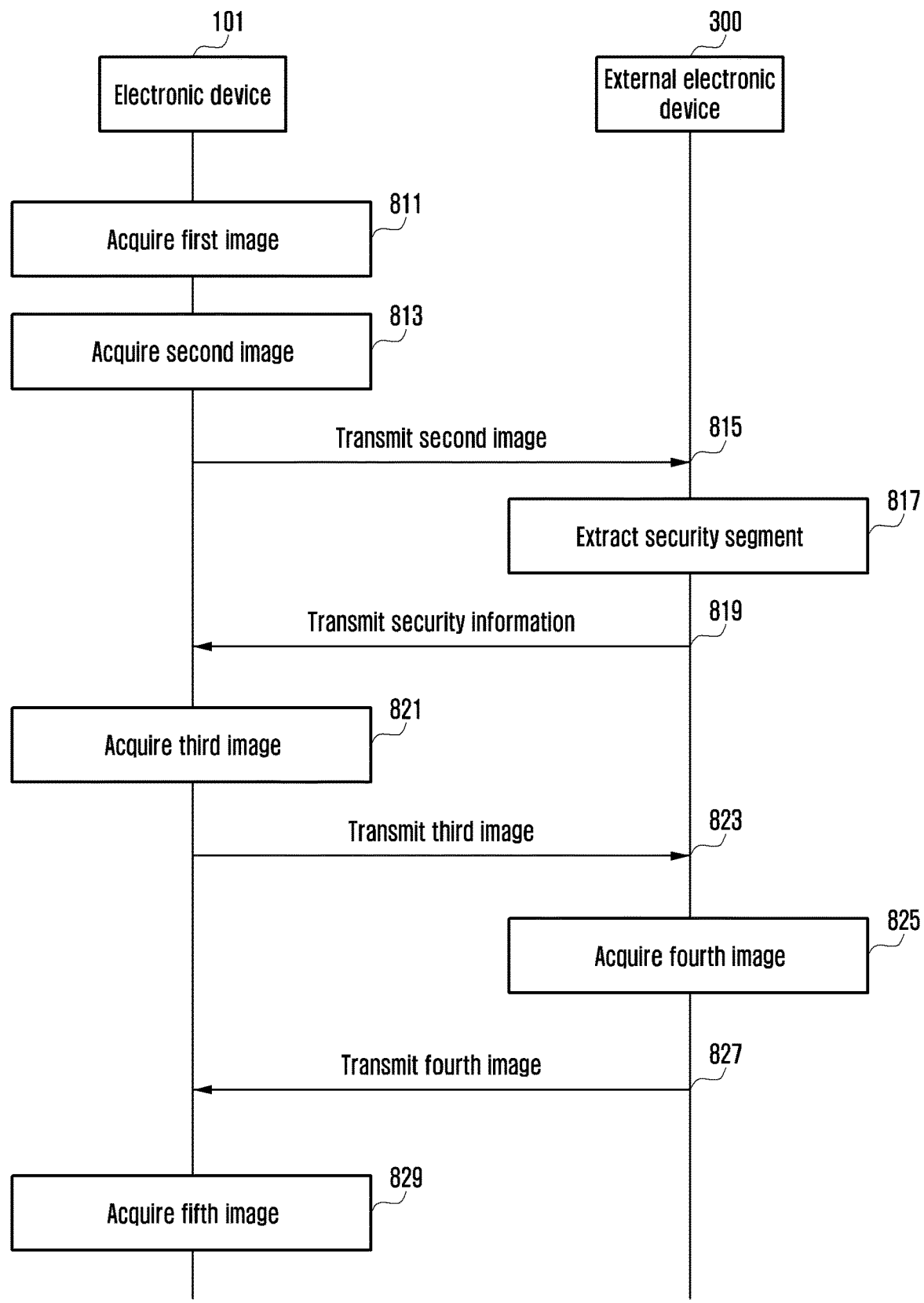
FIG. 8 is a flowchart illustrating a method for securing personal information included in an image in a system according to an embodiment.

FIG. 8 is a flowchart illustrating a method for securing personal information included in an image in a system according to an embodiment.

Referring to FIG. 8, in operation 811, according to an embodiment, the electronic device 101 may acquire a first image including an external object by using an image sensor (e.g. the camera module 180 in FIG. 1, the image sensor 230 in FIG. 2, the image sensor 321 in FIG. 3, or the image sensor 411 in FIG. 4).

In operation 813, according to an embodiment, the electronic device 101 may acquire a second image including less information than the first image by using at least a part of the first image.

In operation 815, according to an embodiment, the electronic device 101 may transmit the second image to the external electronic device 300 (e.g. the electronic device 104 or the server 108 in FIG. 1 or the first electronic device 470 in FIG. 4) through a communication module.

In operation 817, according to an embodiment, the external electronic device 300 may extract, based on the second image, at least one image segment (e.g. a security segment) considered to include personal information. For example, the external electronic device 300 may apply an object recognition algorithm or a text recognition algorithm to the second image so as to identify an object (e.g. a person) or recognize a specific segment of the object (e.g. "a person's face," "a person's eye," or "a person's hand").

In operation 819, according to an embodiment, the external electronic device 300 may transmit security information included in the second image to the electronic device 101. According to one embodiment, the security information may include location information (e.g. pixel coordinates) of the at least one image segment considered to include personal information or identification information of each of the image segments (e.g. "the person's face," "the person's eye," or "the person's hand").

In operation 821, according to an embodiment, the electronic device 101 may acquire third image at least partially based on the first image and the security information. According to an embodiment, the electronic device 101 may acquire the third image in which a second security level segment of the first image has been encoded based on a security key. According to an embodiment, the electronic device 101 may extract a first security level segment from the first image and may generate the third image including the first security level segment.

In operation 823, according to an embodiment, the electronic device 101 may transmit the third image to the external electronic device 300 through the communication module (e.g. the communication module 190 in FIG. 1).

In operation 825, according to an embodiment, the external electronic device 300 may correct at least a part of the third image including the first security level segment to acquire a fourth image.

In operation 827, according to an embodiment, the external electronic device 300 may transmit the fourth image to the electronic device 101.

In operation 829, according to an embodiment, the electronic device 101 may acquire a fifth image by using the fourth image. According to an embodiment, the processor 120 may acquire the fifth image only by decoding the fourth image. According to another embodiment, the processor 120 may acquire the fifth image by synthesizing the fourth image and the security segment image. The fifth image may be stored in the memory 130 of the electronic device 101.

According to an embodiment, an electronic device (e.g. the electronic device 104 or the server 108 in FIG. 1, the external electronic device 300 in FIG. 3, or the first electronic device 470 in FIG. 4) may include: a communication module; a memory (e.g. the storage 335 in FIG. 3); and a processor (e.g. the ISP 333 in FIG. 3 or the processor 471 in FIG. 4) operationally connected to the communication module and the memory. The memory stores instructions that, when executed, cause the processor to: receive an image from an external electronic device (e.g. the electronic device 101 in FIG. 1 or the second electronic device 400 in FIG. 4) through the communication module; recognize at least one image segment in the image; determine security information included in the image and associated with the at least one image segment, at least partially based on a result of the recognition; and transmit the security information to the external electronic device through the communication module.

Figure 9A:
FIG. 9A illustrates an example of a method for securing personal information according to an embodiment.
Figure 9B:
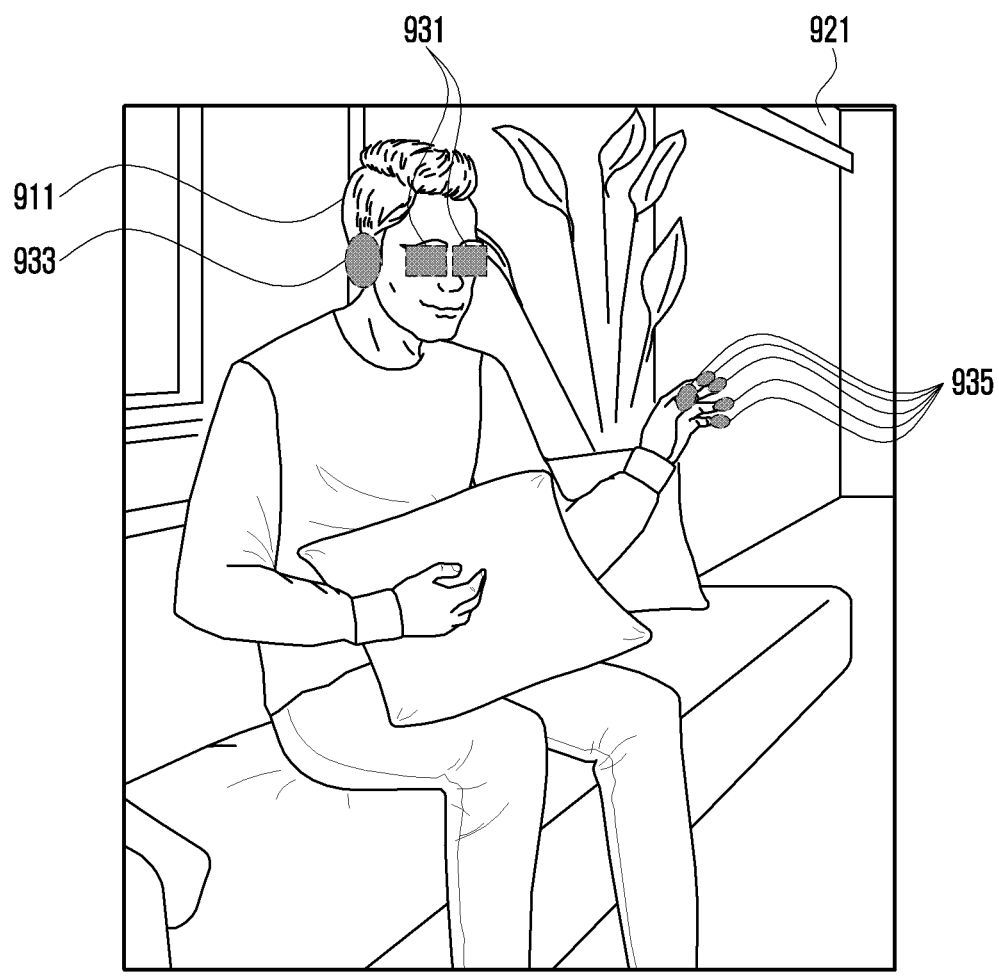
FIG. 9B illustrates an example of a method for securing personal information according to an embodiment.
Figure 9C:
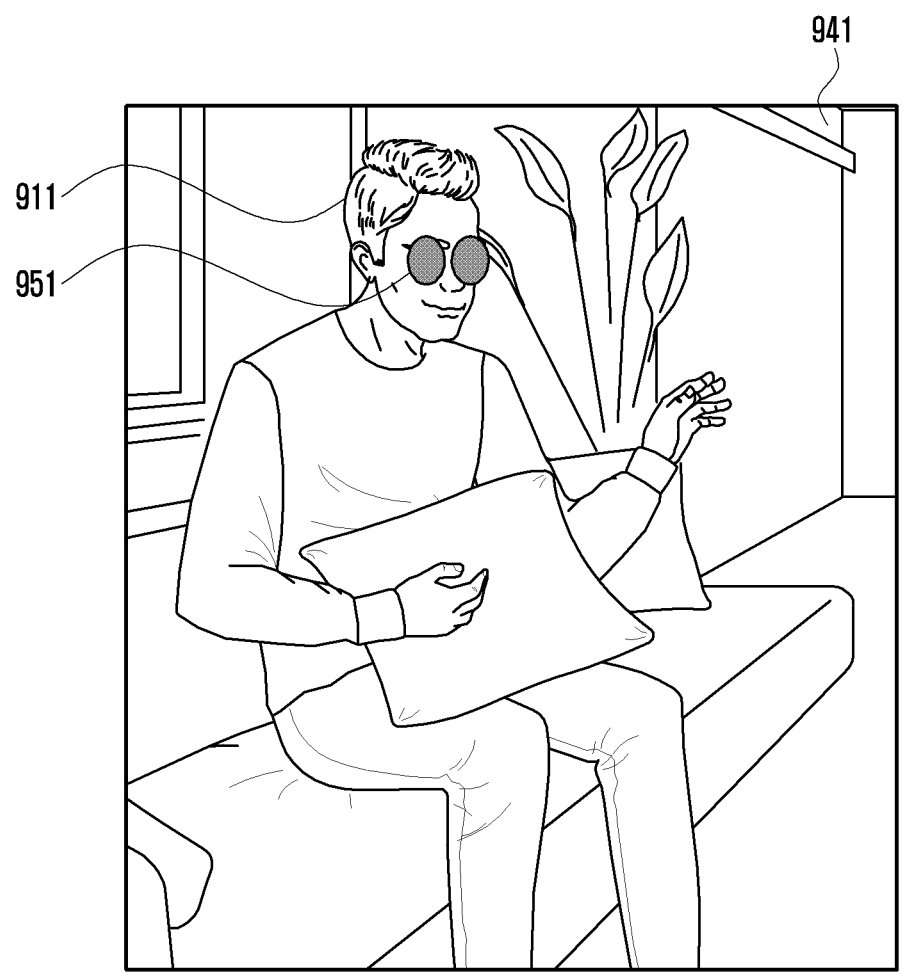
FIG. 9C illustrates an example of a method for securing personal information according to an embodiment.

FIG. 9A illustrates an example of a method for securing personal information according to an embodiment, FIG. 9B illustrates an example of a method for securing personal information according to an embodiment, and FIG. 9C illustrates an example of a method for securing personal information according to an embodiment.

FIG. 9A illustrates a second image 901 (e.g. the small raw image 326 in FIG. 3) including an external object 911. By using at least a part of a first image including the external object 911, the processor 120 may acquire the second image 901 that includes less information than the first image.

FIG. 9B illustrates an image 921 provided to indicate at least one security segment. On the basis of security information received from the external electronic device 300, the processor 120 may provide a user with the image 921 indicating the at least one security segment (e.g. "a person's eye 931," "a person's ear 933," or "a person's hand 935"). According to an embodiment, the processor 120 may divide the first image into a first security level segment and a second security level segment without providing the image 921 to the user. For example, the processor may designate, as the second security level segment, segments corresponding to the "person's eye 931," the "person's ear 933," or the "person's hand 935."

FIG. 9C illustrates a third image 941 in which the second security level segment of the first image has been encoded based on a security key. According to one embodiment, the processor 120 may determine a user input selecting a part or the entirety of the at least one security segment provided through the provided image, and may separate the first security level segment and the second security level segment from each other. For example, if the user select a specific segment (e.g. the person's eye 931) from among the at least one security segment (e.g. the "person's eye 931," the "person's ear 933," or the "person's hand 935") provided in the image, the processor 120 may determine the segment corresponding to the "person's eye 931" as the second security level segment. Further, according to an embodiment, the processor 120 may acquire the third image 941 after dividing the first image into the first security level segment and the second security level segment. According to one embodiment, the third image 941 may have a second security level segment which has been mosaicked, masked (951), or scrambled.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
   a camera including an image sensor;
   a communication module;
   a memory; and
   a processor operationally connected to the camera, the communication module, and the memory, wherein the memory stores instructions that, when executed, cause the processor to:
      acquire a first image including an external object by using the camera;
      generate a second image including less information than information included in the first image using an entirety of the first image;
      transmit the second image to an external electronic device by using the communication module;
      receive security information corresponding to the second image from the external electronic device by using the communication module;
      divide, at least partially based on the security information, the first image into a first security level segment and a second security level segment, security level of the second security level segment being higher than security level of the first security level segment;
      generate a third image in which the second security level segment of the first image is secured at least partially based on the security information;
      transmit the third image to the external electronic device; and
      receive from the external electronic device, a fourth image in which the first security level segment of the third image is at least partially corrected by the external electronic device.

2. The electronic device of claim 1, wherein the security information corresponding to the second image relates to at least one biometric information segment of the external object.

3. The electronic device of claim 1, wherein the instructions further cause the processor to:
   generate a security key and store the security key in the memory;
   acquire a third image in which the second security level segment of the first image is encoded based on the security key; and
   transmit the third image to the external electronic device.

4. The electronic device of claim 3, wherein the instructions further cause the processor to:
   receive, from the external electronic device, a fourth image in which the first security level segment of the third image is at least partially corrected; and
   acquire a fifth image in which the fourth image is decoded using the security key stored in the memory.

5. The electronic device of claim 3, wherein the instructions further cause the processor to acquire the third image by mosaicking, masking, or scrambling the second security level segment of the first image.

6. The electronic device of claim 3, wherein the instructions further cause the processor to:
   extract the first security level segment from the first image and generate the third image including the first security level segment; and
   extract the second security level segment from the first image and generate a security segment image based on the second security level segment.

7. The electronic device of claim 6, wherein the instructions further cause the processor to:
transmit the third image to the external electronic device; and
store the security segment image in the memory.

8. The electronic device of claim 7, wherein the instructions further cause the processor to:
receive, from the external electronic device, a fourth image in which the third image is at least partially corrected; and
acquire a fifth image by synthesizing the fourth image and the security segment image.

9. The electronic device of claim 1, wherein the instructions further cause the processor to:
provide, based on the received security information, a user with an image indicating the first security level segment and the second security level segment; and
separate the first security level segment and the second security level segment from each other, based on a user input selecting a part or an entirety of the first security level segment or the second security level segment.

10. The electronic device of claim 9, wherein the instructions further cause the processor to:
receive another user input designating another segment other than the first security level segment and the second security level segment in the provided image; and
determine the designated another segment as the second security level segment.

11. A method for securing personal information included in an image, the method comprising:
acquiring a first image including an external object by using a camera that includes an image sensor;
generating a second image including less information than the first image using an entirety of the first image;
transmitting the second image to an external electronic device by using a communication module;
receiving security information corresponding to the second image from the external electronic device by using the communication module;
dividing, at least partially based on the security information, the first image into a first security level segment and a second security level segment, security level of the second security level segment being higher than security level of the first security level segment;
generating a third image in which the second security level of segment of the first image is secured, at least partially based on the security information;
transmitting the third image to the external electronic device; and
receiving from the external electronic device, a fourth image in which the first security level segment of the third image is at least partially corrected by the external electronic device.

12. The method of claim 11, wherein the security information corresponding to the second image relates to at least one biometric information segment of the external object.

13. The method of claim 11, further comprising:
generating a security key and storing the security key in a memory;
acquiring a third image in which the second security level segment of the first image is encoded based on the security key; and
transmitting the third image to the external electronic device.

14. The method of claim 13, further comprising:
receiving, from the external electronic device, a fourth image in which the first security level segment of the third image is at least partially corrected; and
acquiring a fifth image in which the fourth image is decoded using the security key stored in the memory.

15. The method of claim 13, further comprising:
extracting the first security level segment from the first image and generating the third image including the first security level segment; and
extracting the second security level segment from the first image and generating a security segment image based on the second security level segment.

16. The method of claim 15, further comprising:
transmitting the third image to the external electronic device; and
storing the security segment image in the memory.

17. The method of claim 16, further comprising:
receiving, from the external electronic device, a fourth image in which the third image is at least partially corrected; and
acquiring a fifth image by synthesizing the fourth image and the security segment image.

* * * * *